United States Patent
Wang et al.

(10) Patent No.: US 10,575,351 B2
(45) Date of Patent: Feb. 25, 2020

(54) D2D COMMUNICATION METHOD AND D2D-ENABLED WIRELESS DEVICE

(71) Applicant: Sun Patent Trust, New York, NY (US)

(72) Inventors: Lilei Wang, Beijing (CN); Hidetoshi Suzuki, Kanagawa (JP); Masayuki Hoshino, Kanagawa (JP)

(73) Assignee: Sun Patent Trust, New York, NY (US)

( * ) Notice: Subject to any disclaimer, the term of this patent is extended or adjusted under 35 U.S.C. 154(b) by 154 days.

(21) Appl. No.: 15/280,889

(22) Filed: Sep. 29, 2016

(65) Prior Publication Data

US 2017/0019943 A1    Jan. 19, 2017

Related U.S. Application Data

(63) Continuation of application No. PCT/CN2014/077697, filed on May 16, 2014.

(51) Int. Cl.
*H04W 76/14* (2018.01)
*H04W 72/04* (2009.01)
*H04W 72/12* (2009.01)

(52) U.S. Cl.
CPC ....... *H04W 76/14* (2018.02); *H04W 72/0446* (2013.01); *H04W 72/12* (2013.01)

(58) Field of Classification Search
None
See application file for complete search history.

(56) References Cited

U.S. PATENT DOCUMENTS

| | | | |
|---|---|---|---|
| 2009/0181692 A1 | 7/2009 | Gaal et al. | |
| 2013/0322413 A1 | 12/2013 | Pelletier et al. | |
| 2015/0215903 A1* | 7/2015 | Zhao | H04W 72/04 370/329 |
| 2015/0327315 A1* | 11/2015 | Xue | H04L 5/0044 370/330 |
| 2017/0027014 A1* | 1/2017 | Chae | H04W 76/14 |
| 2017/0055240 A1* | 2/2017 | Kim | H04W 76/14 |
| 2017/0079084 A1* | 3/2017 | Matsumoto | H04W 76/14 |
| 2017/0164381 A1* | 6/2017 | Kim | H04W 72/12 |

FOREIGN PATENT DOCUMENTS

EP    3 128 797 A1    2/2017

OTHER PUBLICATIONS

Ericsson, "On Scheduling Assignment and Receiver Behaviour," R1-141391, 3GPP TSG-RAN WG1 Meeting #76bis, Agenda Item: 7.2.7.1.2, Shenzhen, China, Mar. 31-Apr. 4, 2014, 6 pages.

(Continued)

*Primary Examiner* — Saba Tsegaye
(74) *Attorney, Agent, or Firm* — Seed IP Law Group LLP

(57) ABSTRACT

Provided are D2D communication methods and D2D-enabled wireless devices. The D2D communication method performed by a D2D-enabled wireless device includes transmitting signals in D2D subframes with a randomization pattern. The randomization pattern is designed based on relative subframe positions in a virtual pure D2D subframe sequence composed of multiple D2D subframes in one or more radio frames. In another embodiment, the eNB scheduling based resource allocation and the D2D-enabled wireless device selection on its own based resource allocation share a same randomization pattern design.

16 Claims, 11 Drawing Sheets

(56) References Cited

OTHER PUBLICATIONS

Extended European Search Report, dated May 18, 2017, for corresponding EP Application No. 14892051.5-1857 / 3143821, 7 pages.
International Search Report dated Feb. 17, 2015, for corresponding International Application No. PCT/CN2014/077697, 3 pages.
Sharp, "Consideration on Configurable CP Length for D2D Transmission," 3GPP TSG-RAN WG1#77 R1-142202, 3GPP, May 10, 2014.
LG Electronics, "On the D2D-related information sharing between in-coverage UEs and out-coverage UEs," 3GPP TSG-RAN WG1#77 R1-142158, 3GPP, May 10, 2014.
Fujitsu, "Distributed resource allocation for D2D broadcast," 3GPP TSG-RAN WG1#77 R1-142073, 3GPP, May 9, 2014.
Sony, "D2D Resource Fool and Scheduling Assignments.," 3GFP TSG-RAN WG1#76b R1-141571, 3GPP, Mar. 22, 2014.
Intel Corporation, "Analysis of Multi-hop Synchronization Procedures with Prioritized Hop Count," 3GPP TSG-RAN WG1#77 R1-142317, 3GPP May 10, 2014.

\* cited by examiner

400

TRANSMITTING SIGNALS IN D2D SUBFRAMES
WITH A RANDOMIZATION PATTERN IN TIME DOMAIN

D2D COMMUNICATION METHOD AND D2D-ENABLED WIRELESS DEVICE

BACKGROUND

1. Technical Field

The present disclosure relates to the field of device to device (D2D) COMMUNICATION, AND IN PARTICULAR, TO D2D COMMUNICATION METHODS AND D2D-enabled wireless devices

2. Description of the Related Art

Device-to-device (D2D) communication is direct communication between devices and is a new topic in 3GPP ($3^{rd}$ Generation Partnership Project) LTE (Long Term Evolution) Release 12. D2D communication could happen with wireless network coverage (e.g. for commercial case) or without network coverage (e.g. for public safety). FIG. 1 illustrates exemplary D2D communications with and without wireless network coverage. On the left side of FIG. 1, UE 101 and UE 102 are within the wireless network coverage of eNB 103, but they are communicating with each other directly (i.e. not through eNB 103) and eNB 103 is used for synchronization, resource scheduling or the like. On the right side of FIG. 1, UE 104 and UE 105 are not within any wireless network coverage, and they are communicating with each other directly.

3GPP RAN1#76 meeting agreed eNB scheduling based resource allocation (Mode 1) as baseline resource allocation method in network-coverage (INC) scenario and UE selection on its own based resource allocation (Mode 2) is baseline resource allocation method in out-of-coverage (OOC) scenario.

SUMMARY

In one general aspect, the techniques disclosed here feature a device-to-device (D2D) communication method performed by a D2D-enabled wireless device, including: transmitting signals in D2D subframes with a randomization pattern in time domain, wherein the randomization pattern is designed based on relative subframe positions in a virtual pure D2D subframe sequence composed of multiple D2D subframes in one or more radio frames.

According to the general aspect, different D2D subframe configurations (e.g., different D2D subframe ratios) can share the same randomization pattern designing.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
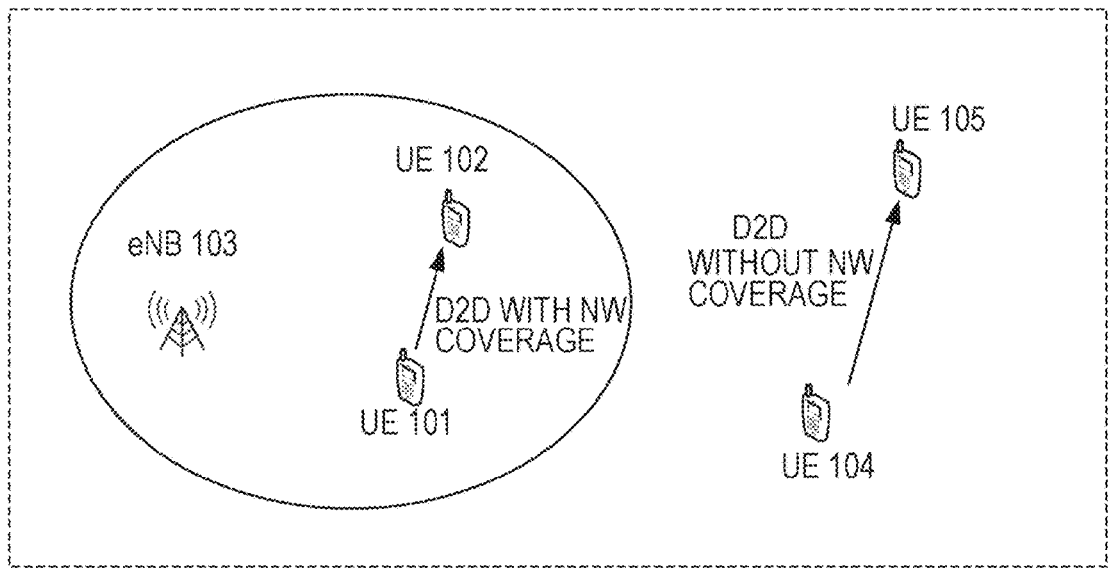
FIG. 1 illustrates exemplary D2D communications with and without wireless network coverage.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

It is noted that some descriptions may be made based on user equipments (UEs) in the specification; however, the D2D-enabled wireless devices in the present disclosure are not limited to mobile phones like UEs but can be for example notebooks, pads, sensors or other devices with D2D wireless communication capability.

Half duplex is a basic property in D2D communication which means one UE cannot receive and transmit simultaneously in the same subframe, and in-band emission is also a critical issue in D2D system WHICH means one UE's transmission will cause heavy power leakage to other PRBs transmitted by another UE. So if two UEs' D2D channels are always allocated in the same subframe, they could not receive each other's signals due to half duplex issue and may get very heavy interference from another UE. Based on such considering, randomization of resource allocation especially in time domain is a reasonable approach to relax the two issues above.

One assumption to do randomization is based on randomization pattern. Once a UE chooses one randomization pattern, the UE will transmit D2D signals based on that pattern for some time. Different UEs may select different randomization patterns. Thus, the randomization effect is reflected in different randomization patterns. To design a randomization pattern for relatively longer time resource allocation instead of dynamic selection in each subframe could also simplify the design on SA (Scheduling Assignment) to save the indication signaling and reduce UE's complexity (not necessary to often monitor channel).

In D2D communication, a D2D-enabled wireless device may transmit signals in multiple subframes. Herein, the term of "signal" refers to any content transmitted in a subframe, which can be any content in data, control, and/or discovery channel, and "one signal" herein refers to respective content transmitted in one subframe. For example, "one signal" may be one transport block (packet) without retransmission. In this case, the one transport block is transmitted in one subframe. Alternatively, "one signal" may also be one of the retransmissions of one transport block. In this case, the one transport block is transmitted in more than one subframe each of which transmits one retransmission, and thus one retransmission represents one signal. In the present disclosure, the randomization pattern can be designed based on a predetermined number of subframes, and for the next predetermined number of subframes, the randomization pattern can be simply repeated. In other words, the designing of the randomization pattern is to determine how to distribute signals in a predetermined number of subframes for each D2D-enabled wireless device.

Figure 2:
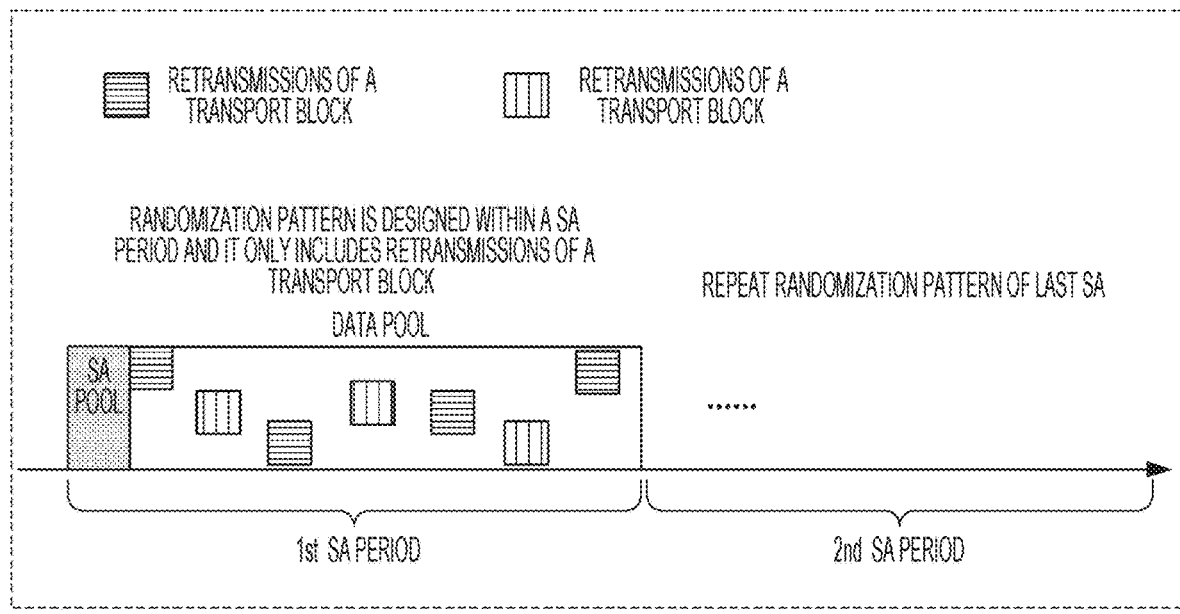
FIG. 2 illustrates an example of designing randomization patterns in one SA period.

For some embodiments in the present disclosure, assumption is made to design randomization patterns based on retransmissions of a transport block, which are transmitted within one scheduling assignment (SA) period. In other words, the signals described in the above are retransmissions of a transport block. For example, how four retransmissions of a transport block are dropped within 20 ms which is the SA period is to be determined. And, for relatively longer data pattern (e.g., 100 ms or 200 ms), the randomization pattern of retransmissions in one SA period can just be repeated. FIG. 2 shows an example of designing the randomization patterns in one SA period. In FIG. 2, two patterns for retransmissions of a transport block are determined in the first SA period and the second SA period can just repeat the patterns in the first SA period. It is noted that the retransmissions of one transport block herein could represent same content or different content depending on different soft-combining method but all these retransmissions are related to the same transport block or packet. If the soft-combining method is Chase Combining (CC), then each retransmission is the same. A receiving UE just accumulates those retransmission signals and decodes a relevant packet. If the method is Incremental Redundancy (IR), each retransmission's content is different and a receiving UE could realize lower coding rate. One exemplary type of traffic which may need retransmissions here is VoIP as such traffic usually needs multiple retransmissions for one packet to guarantee enough receiving performance.

It is noted that although some embodiments are based on retransmissions of a transport block, those embodiments also apply to transmissions of several transport blocks without retransmission, and the time period for designing the randomization pattern is not limited to one SA period, but it can be any time period, e.g. two SA periods.

Figure 3:
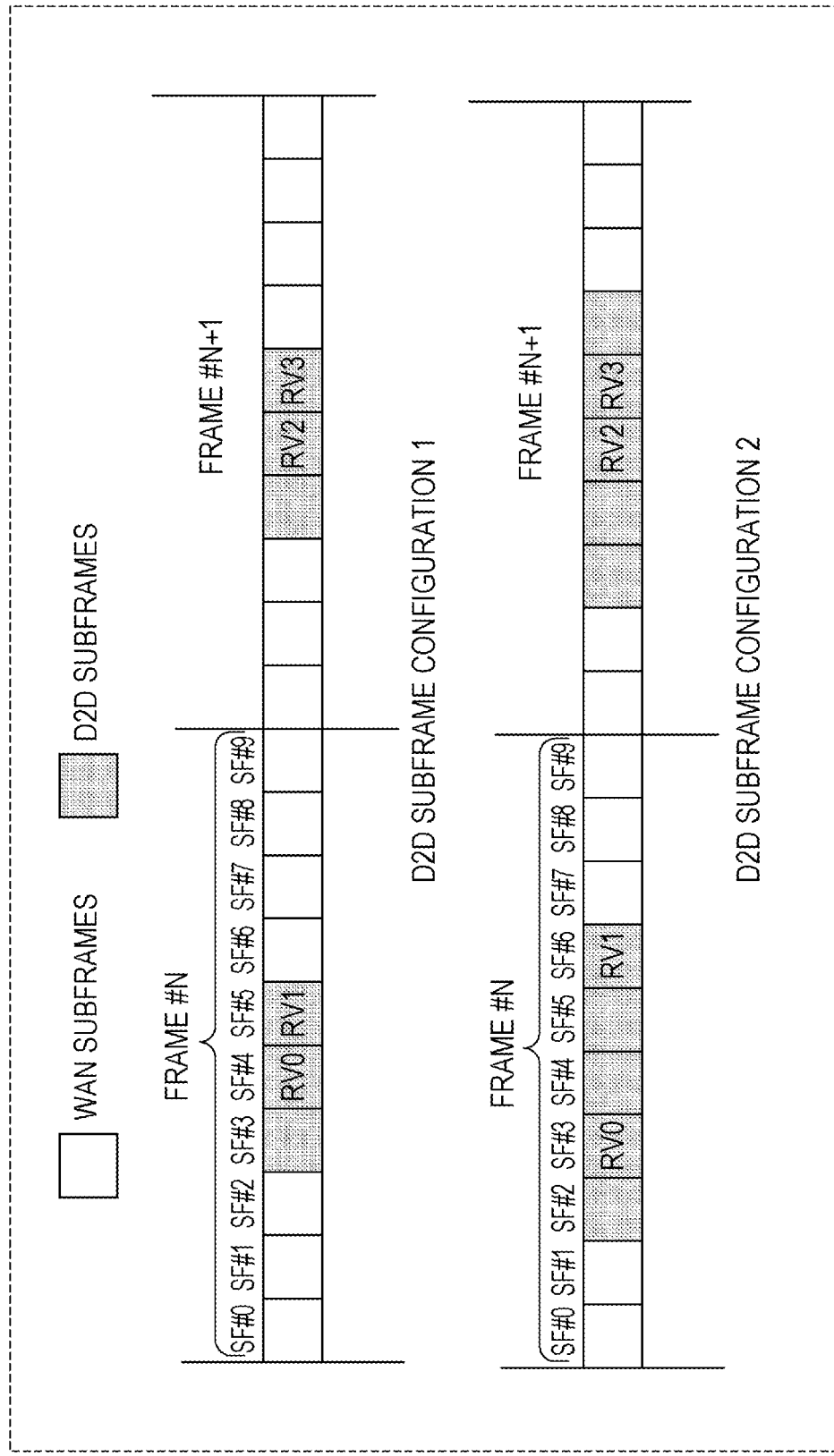
FIG. 3 illustrates exemplary randomization pattern designing based on absolute D2D subframe and frame index for retransmissions of one transport block.

As a possible solution to design the randomization pattern for transmitting signals, the randomization pattern can be designed based on absolute D2D subframe and/or frame index as shown in FIG. 3. FIG. 3 shows exemplary randomization pattern designing based on absolute D2D subframe and frame index for retransmissions of one transport block. Here, four retransmissions RV0, RV1, RV2 and RV3 need to be distributed. In D2D subframe configuration 1, only 3 subframes are used for D2D communication (i.e. 3 D2D subframes), which are SF #3, SF #4 and SF #5, in one radio frame. The four retransmissions are designed to be located in SF #4 of Frame # N, SF #5 of Frame # N, SF #4 of Frame # N+1, and SF #5 of Frame # N+1 respectively. In other words, the randomization pattern for retransmissions is designed based on absolute D2D subframe and frame index. In addition, in D2D subframe configuration 2, 5 subframes are used for D2D communication, which are SF #2 to SF #6, and the four retransmissions are designed to be located in SF #3 of Frame # N, SF #6 of Frame # N, SF #4 of Frame # N+1, and SF #5 of Frame # N+1 respectively. It can be seen that in this solution, for a different D2D subframe configuration (for example, a different D2D subframe ratio which is the ratio of the number of D2D subframes to the total number of subframes in one radio frame), it may be needed to design a special randomization pattern.

In the present disclosure, improved solutions for designing the randomization pattern are provided.

First Embodiment

Figure 4:
FIG. 4 illustrates a flowchart of a D2D communication method performed by a D2D-enabled wireless device according to an embodiment of the present disclosure.

In the first embodiment, a D2D communication method 400 performed by a D2D-enabled wireless device is provided as shown in FIG. 4. The D2D communication method 400 performed includes a step 401 of transmitting signals in D2D subframes with a randomization pattern in time domain. As described in the above, in order to avoid conflicting between different D2D-enabled wireless devices, the signals can be transmitted in respective D2D subframes with a randomization pattern in time domain, and different D2D-enabled wireless devices may choose different randomization patterns. In the embodiment, the randomization pattern is designed based on relative subframe positions in a virtual pure D2D subframe sequence composed of multiple D2D subframes in one or more radio frames. In other words, the randomization pattern in the first embodiment is designed not based on absolute D2D subframe and/or frame index, but based on relative subframe positions in a virtual pure D2D subframe sequence. In the virtual pure D2D subframe sequence, only D2D subframes are included without LTE WAN subframes, and the D2D subframes in the virtual pure D2D subframe sequence are extracted from one or more radio frames. The length of (the number of subframes in) the virtual pure D2D subframe sequence can be determined arbitrary depending on application scenarios. For example, the length can be one SA period. In addition, the relative subframe position (index) herein can for example be a sequence number of a D2D subframe starting from the first D2D subframe in the virtual pure D2D subframe sequence. For example, if there are 10 D2D subframes in the virtual pure D2D subframe sequence, the relative subframe positions (indexes) of the first D2D subframe to the tenth D2D subframes are 0, 1, 2, . . . , 9 respectively in the sequence. According to the first embodiment, the signals to be transmitted in the randomization pattern can be assigned to relative subframe positions in the virtual pure D2D subframe sequence regardless of corresponding absolute subframe and frame index. For example, signal #1 is assigned to the D2D subframe with a relative subframe position of 2 in the virtual pure D2D subframe sequence, signal #2 is assigned to the D2D subframe with a relative subframe position of 5, signal #3 is assigned to the D2D subframe with a relative subframe position 7, and so on, regardless of which absolute subframe and frame indexes those relative subframe positions are corresponding to. Therefore, according to the first embodiment, different D2D subframe configurations (for example, different D2D subframe ratios) can share the same randomization pattern designing.

Figure 5:
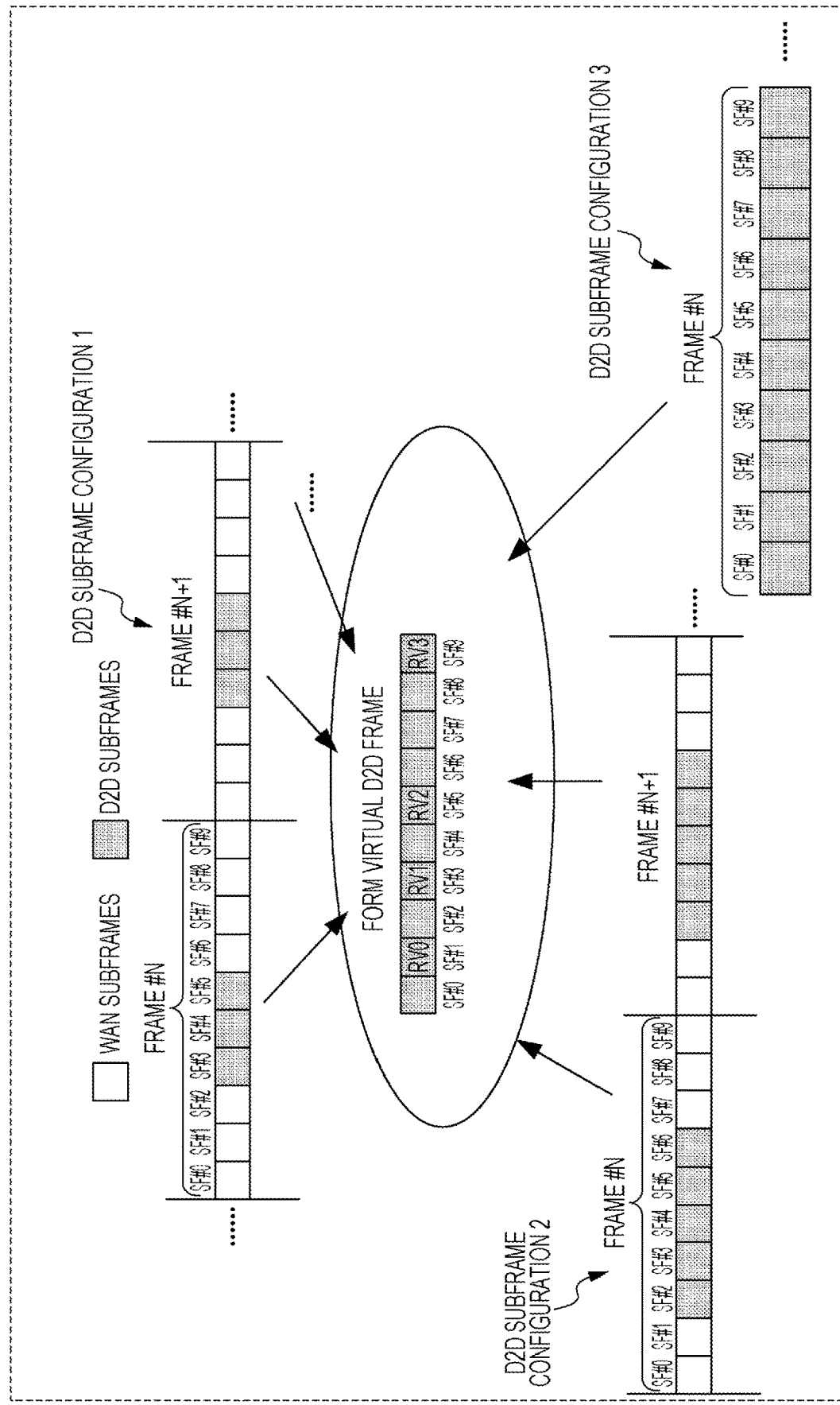
FIG. 5 illustrates exemplary randomization pattern designing based on relative subframe positions in a virtual pure D2D subframe sequence for retransmissions of one transport block according to an embodiment of the present disclosure.

FIG. 5 shows exemplary randomization pattern designing based on relative subframe positions in a virtual pure D2D subframe sequence for retransmissions of one transport block. In the example of FIG. 5, the signals are retransmissions of a transport block; however, it also applies to the cases that the signals are transmissions of transport blocks. In FIG. 5, a virtual pure D2D subframe sequence with 10 subframes is organized, which can be regarded as a virtual D2D frame. In the virtual D2D frame, all the subframes are used for D2D communication. The D2D subframes in the virtual D2D frame are corresponding to (or can be mapped to) respective D2D subframes in one or more radio frames. Three D2D subframe configurations are exemplarily illustrated in FIG. 5. In D2D subframe configuration 1, three subframes in one radio frame are configured for D2D communication, i.e., the D2D subframe ratio is 30%. In D2D subframe configuration 2, five subframes in one radio frame are configured for D2D communication, i.e., the D2D subframe ratio is 50%. In D2D subframe configuration 3, all subframes in one radio frame are configured for D2D communication, i.e., the D2D subframe ratio is 100%. In practice, D2D subframe configurations 1 and 2 can be used for state 1/2/3 UEs, which means their D2D transmission is in limited resources to avoid interference to LTE WAN traffics, and D2D subframe configuration 3 can be used for state 4 UEs. The definition of state 1/2/3/4 UEs can refer to R1-140778, "On scheduling procedure for D2D" by Ericsson, which is incorporated herein by reference. The D2D subframes in the virtual D2D frame can be (or mapped to) any D2D subframes in the radio frames. Preferably, the D2D subframes in the virtual D2D frame are consecutive D2D subframes in one or more radio frames. Here, "consecutive D2D subframes" means that there are no other D2D subframe(s) between them, but there can be other LTE WAN subframe(s). For example, for D2D subframe configuration 1, the D2D subframes SF #0 to SF #9 in the virtual D2D frame can be subframes SF #3 to SF #5 in Frame # N, subframes SF #3 to SF #5 in Frame # N+1, subframes SF #3 to SF #5 in Frame # N+2 (not shown), and subframe SF #3 in Frame # N+3 (not shown) respectively; for D2D subframe configuration 2, the D2D subframes SF #0 to SF #9 in the virtual D2D frame can be subframes SF #2 to SF #6 in Frame # N and subframes SF #2 to SF #6 in Frame # N+1 respectively; and for D2D subframe configuration 3, the D2D subframes SF #0 to SF #9 in the virtual D2D frame can be subframes SF #0 to SF #9 in Frame # N. According to the first embodiment of the present disclosure, the randomization pattern can be designed based on relative subframe positions in the virtual pure D2D subframe sequence. In the example of FIG. 5, the designing of the randomization pattern is to determine which D2D subframes in the virtual D2D frame the retransmissions of the transport block should be dropped to. The relative subframe positions (indexes) in the virtual D2D frame will be used to indicate the subframes to be assigned with the retransmissions. As an example shown in FIG. 5, retransmissions RV0, RV1, RV2 and RV3 are respectively assigned to subframes SF #1, SF #3, SF #5 and SF #9 (relative subframe positions) in the virtual D2D frame. After the retransmissions are assigned to the relative subframe positions in the virtual D2D frame, the retransmissions can be assigned to D2D subframes in radio frames by means of the above mentioned mapping for different D2D subframe configurations. According to the first embodiment, the same randomization pattern designing can be used for different D2D subframe configurations and thus for UEs with different states. Therefore, it is not necessary to design different randomization patterns for different D2D subframe configurations, which can simplify the randomization pattern designing and test efforts.

Figure 6:
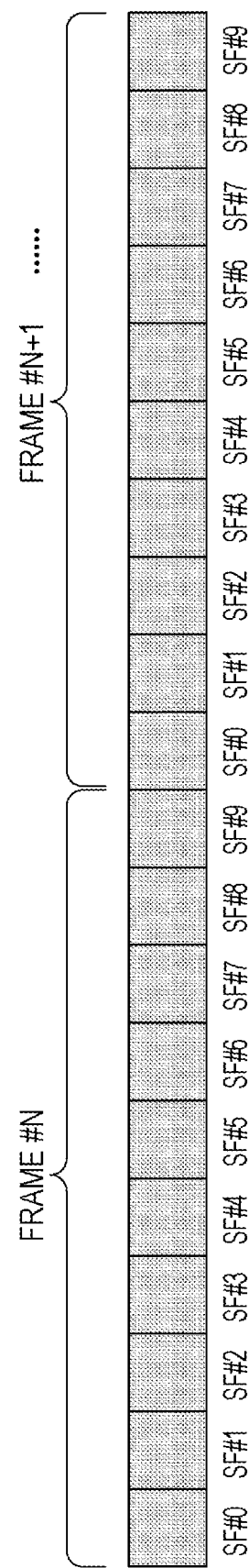
FIG. 6 illustrates an exemplary virtual pure D2D subframe sequence according to an embodiment of the present disclosure.

It is noted that the size of the virtual pure D2D subframe sequence in the above example is 10 subframes which equals to one frame, but the size of the virtual pure D2D subframe sequence can be determined arbitrarily depending on different applications. Preferably, the virtual pure D2D subframe sequence includes one or more virtual D2D frames each composed of 10 D2D subframes as shown in FIG. 6. In this case, the terminology in the LTE can be easily applied to the present disclosure.

Figure 7:
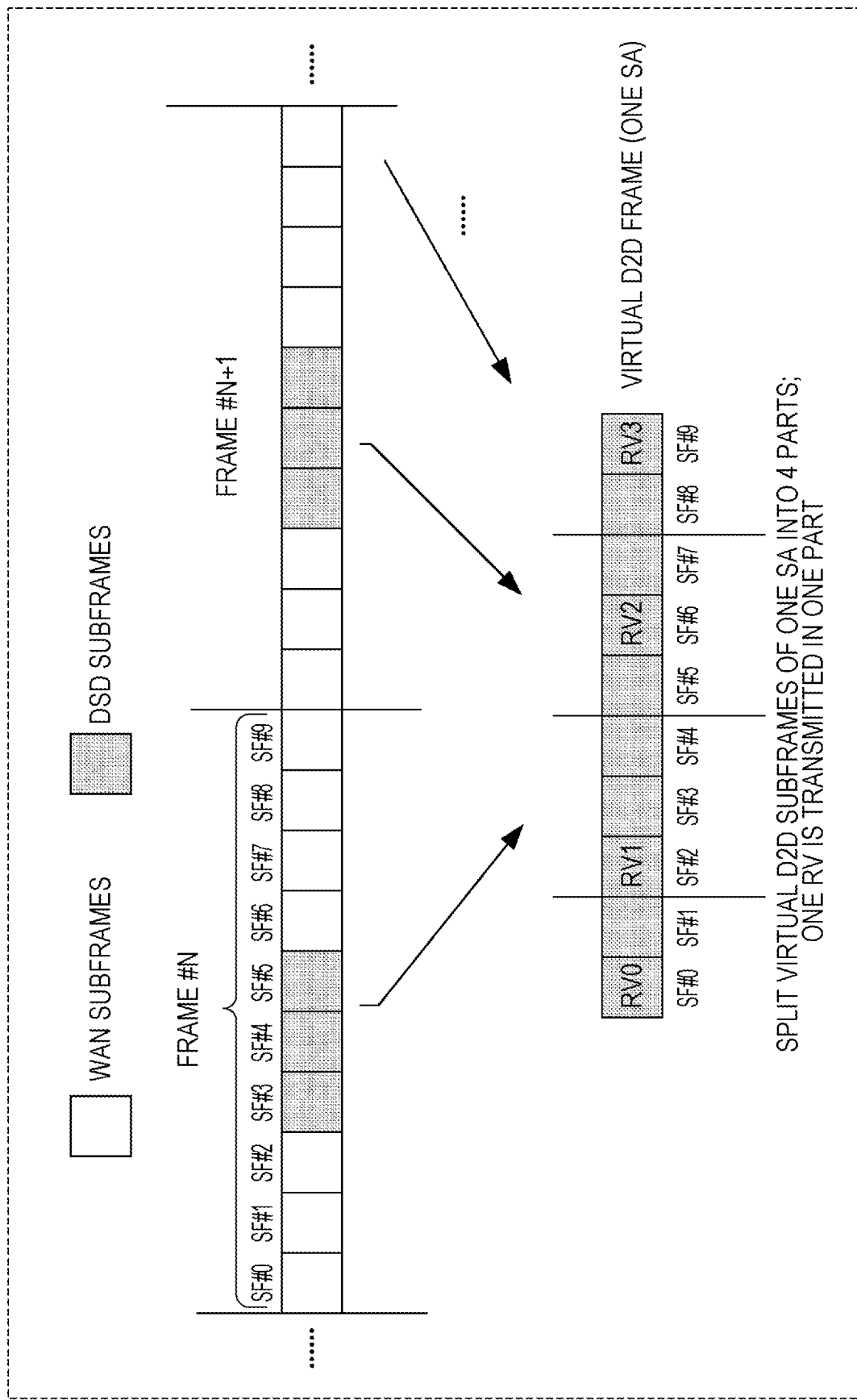
FIG. 7 illustrates an example of splitting of the virtual pure D2D subframe sequence and assignment of the signals, in which one signal is transmitted in one part.
Figure 8:
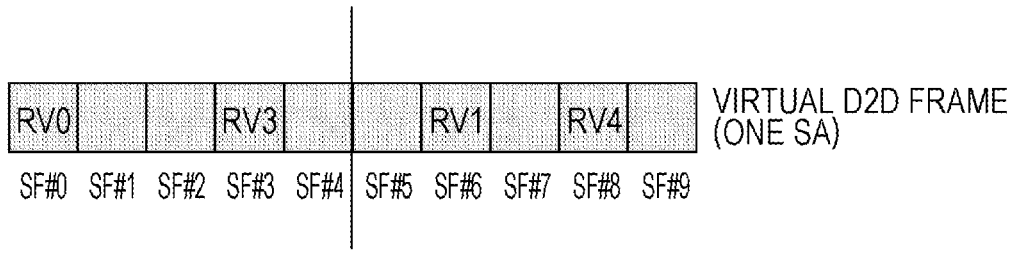
FIG. 8 illustrates another example of splitting of the virtual pure D2D subframe sequence and assignment of the signals, in which two signals are transmitted in one part.

In the first embodiment, the virtual pure D2D subframe sequence can be composed of multiple consecutive D2D subframes in one or more radio frames as described above. In this case, in order to get good diversity gain, the virtual pure D2D subframe sequence can be split into several parts in each of which one or more signals are transmitted. FIG. 7 shows an example of splitting of the virtual pure D2D subframe sequence and assignment of the signals, in which one signal is transmitted in one part. In FIG. 7, the randomization pattern is designed within one SA period which is shown as one virtual D2D frame, and such a virtual D2D frame is split to 4 parts. Each part can drop one retransmission of a transport block, for example RV0, RV1, RV2 or RV3. Such behavior can be useful to get good diversity gain since retransmissions are more distributed. Alternatively, when the number of signals to be transmitted (retransmission times) within the randomization pattern is larger than the number of the split parts, more than one signals may be dropped into one part. FIG. 8 shows such an example. In FIG. 8, the retransmission times (4) is larger than the number of the split parts (2), and two retransmissions are transmitted in each part. In that case, some offset could be designed between the two retransmissions in the same part to avoid being close to each other.

Figure 9:
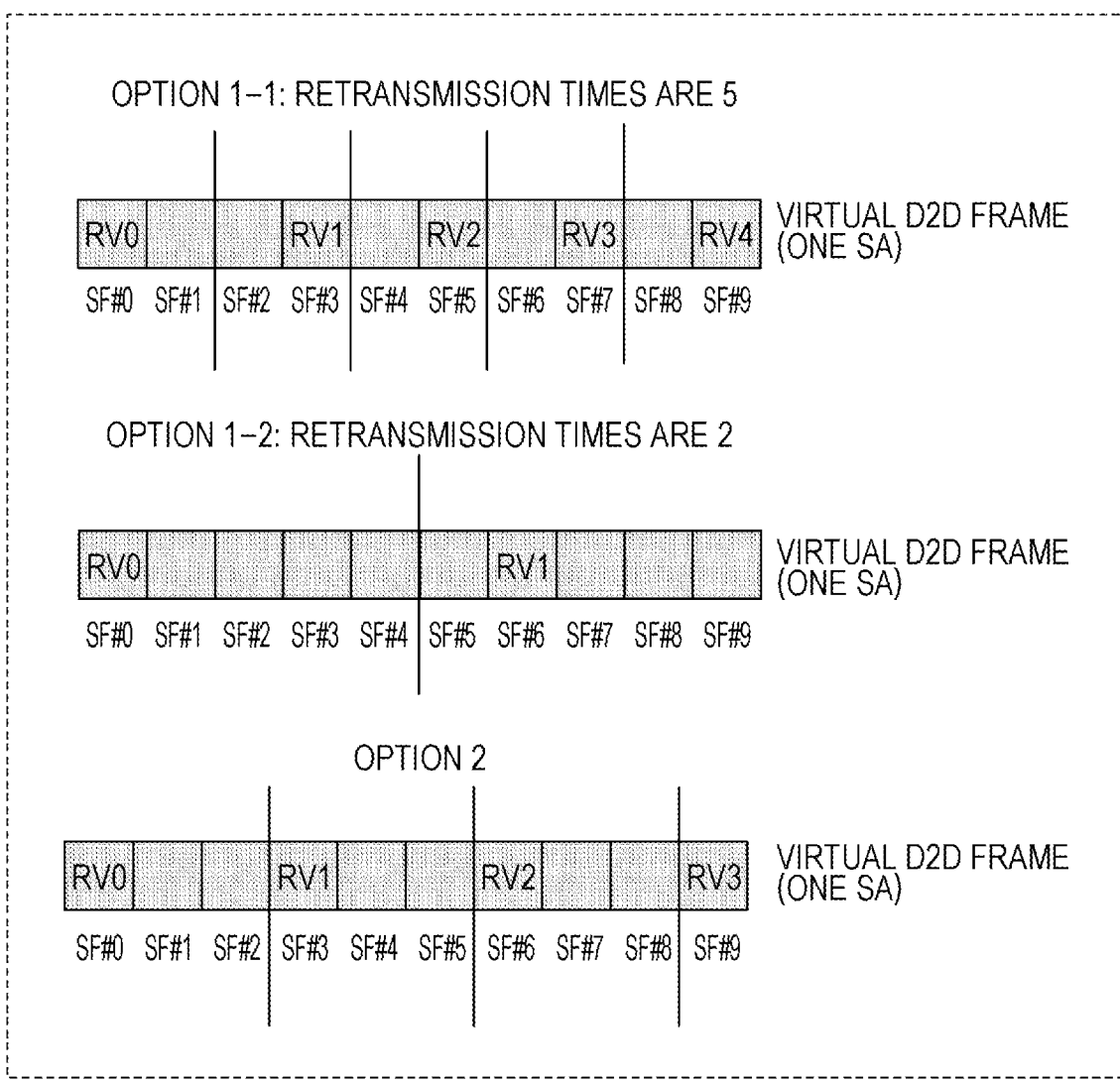
FIG. 9 illustrates options for determining the number of parts to be split in a virtual pure D2D subframe sequence.

Regarding how many parts the randomization pattern should be split, it can be determined according to application scenarios. In the following, two exemplary options are described. In a first option, the number of the parts can be determined based on the number of signals to be transmitted (e.g. retransmission times) within the randomization pattern. Preferably, the number of the parts is equal to the number of signals to be transmitted within the randomization pattern. Option 1-1 and option 1-2 in FIG. 9 show the above option. In option 1-1, the virtual D2D frame within one SA period (10 virtual D2D subframes) is split into 5 parts as the retransmission times are 5, and RV0-RV4 are dropped into respective parts. In option 1-2, the retransmission times are 2, and thus the virtual D2D frame is split into 2 parts. RV0 and RV1 are dropped into respective parts. In a second option, the number of the several parts is determined based on D2D subframe ratio. As described in the above, the D2D subframe ratio represents the ratio of the number of D2D subframes to the total number of subframes in one radio frame. According to the second option, the D2D subframes in the same radio frame would be grouped into one part. Option 2 in FIG. 9 shows the second option by taking the D2D subframe ratio (30%) in FIG. 7 as an example. As shown, the virtual D2D frame is split into 4 parts, in which each of first three parts has three D2D subframes which are corresponding to the three D2D subframes in one radio frame as shown FIG. 7, and the last part has only one D2D subframe.

Figure 10:
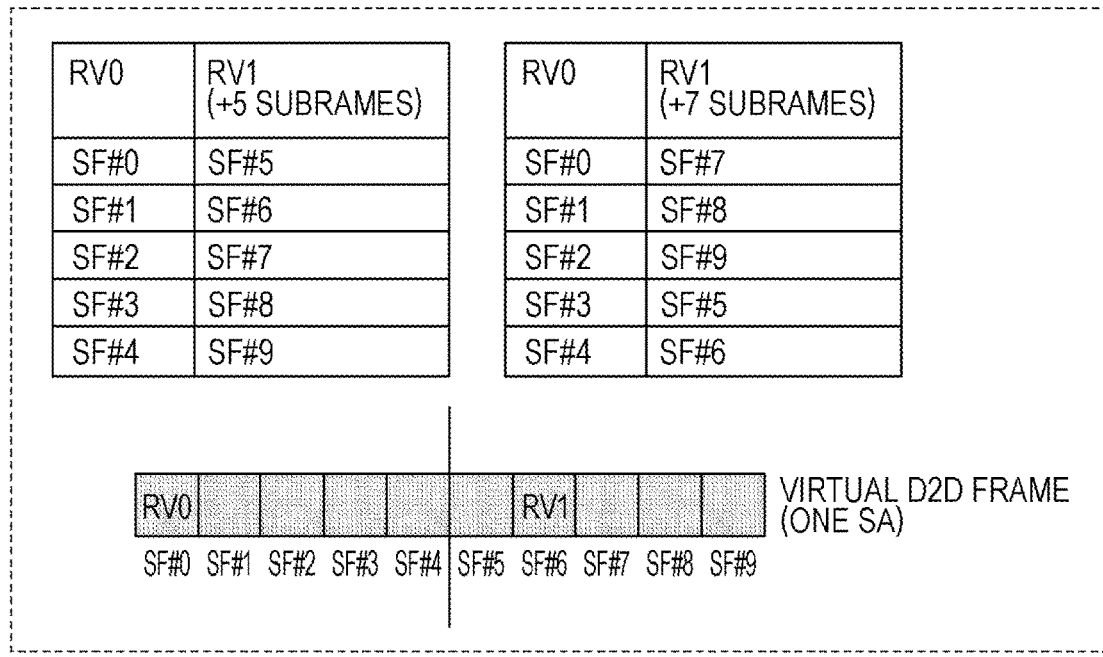
FIG. 10 illustrates an example of assigning signals to subframes in each part of a virtual pure D2D subframe sequence based on cyclic shift.

Regarding how to drop each transmission within each split part, it can be determined according to application scenarios. For example, the one or more signals to be transmitted in each part of the virtual pure D2D subframe sequence can be randomly assigned to the D2D subframes in respective part. As another example, the one or more signals to be transmitted in each part of the virtual pure D2D subframe sequence can be assigned to the D2D subframes in respective part based on cyclic shift. FIG. 10 shows an assignment example based on cyclic shift. Here, suppose both of the number of the split parts and the retransmission times are 2 as shown in option 1-2 of FIG. 9, then the index of the D2D subframe to transmit the retransmission in each part cyclically shifts. As exemplarily shown in FIG. 10, the D2D subframe for RV0 can cyclically shifts from SF #0 to SF #4, and so on; and the D2D subframe for RV1 can cyclically shifts from SF #5 to SF #9, and so on, or from SF #7 to SF #9 then back to SF #5, and so on. Nevertheless, the initial index of the cyclic shift can be arbitrarily determined.

In addition, in the first embodiment, different randomization pattern designs or a same randomization pattern design with different initializations can be designed for different clusters or cells based on cell or cluster IDs. In the present disclosure, the term of "randomization pattern design" refers to a principle, an equation, a list or the like for determining the randomization pattern. For example, a pattern list consisting of multiple randomization patterns can be regarded as a randomization pattern design. The term of "initialization" may refer to an initial condition input to the principle or an initial value input to the equation to generate a randomization pattern according to the principle or the equation, or an index to select a randomization pattern in the list.

Additionally, as described in the above, the randomization pattern can be designed for one virtual pure D2D subframe sequence, and for other (e.g. following) virtual pure D2D subframe sequences, the randomization pattern can be simply repeated. In contrast, different virtual pure D2D subframe sequences may use different randomization patterns. Alternatively, different virtual pure D2D subframe sequences can share a same randomization pattern design and the initialization of the same randomization pattern design for each virtual pure D2D subframe sequence can be determined based on a sequence number of respective virtual pure D2D subframe sequences. The sequence number can be any number to indicate the sequence, for example it can be same as the frame index of the virtual D2D frames. For example, as shown in FIG. 6, for virtual D2D frames Frame # N and Frame # N+1, the initialization can be determined based on the sequence numbers N and N+1 respectively. In addition, the sequence number could also be SA period index.

Figure 11:
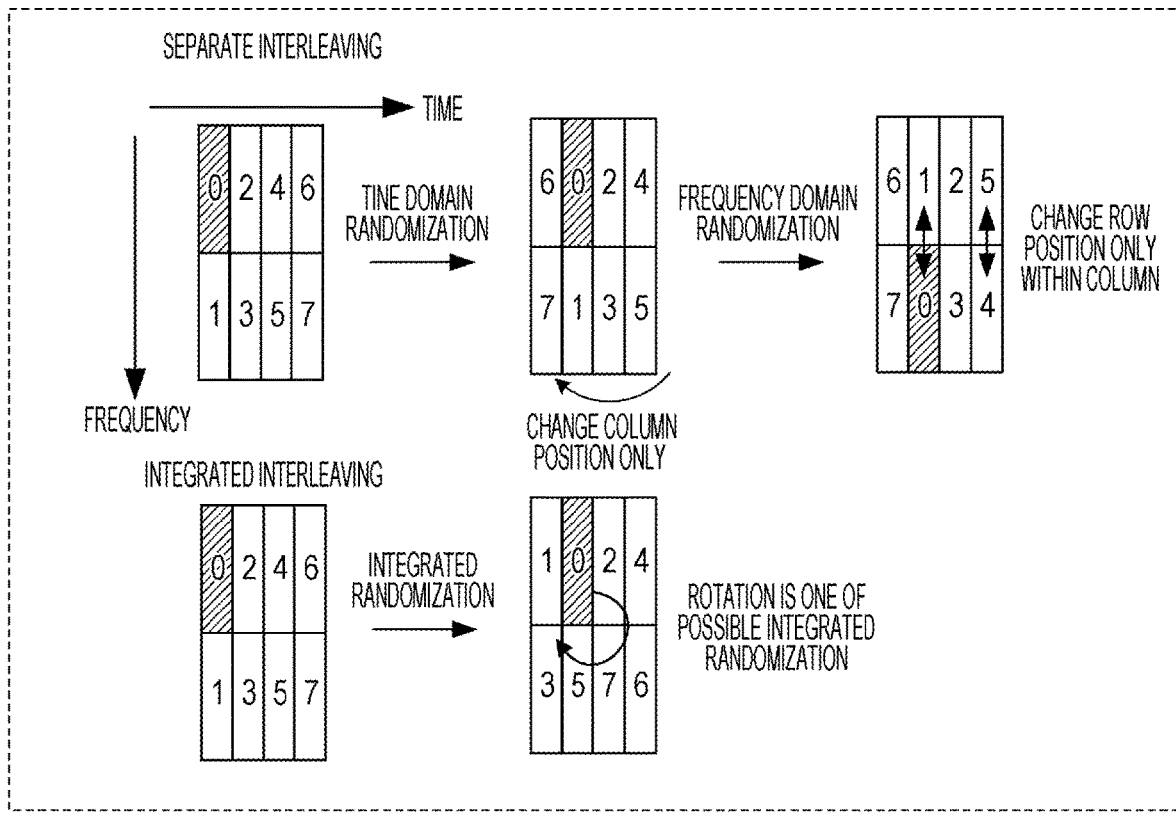
FIG. 11 illustrates an example of the separate interleaving and the integrated interleaving according to an embodiment of the present disclosure.

Further, in the first embodiment, interleaving in time and frequency domain can be performed in the designing of the randomization pattern. The interleaving in time and frequency domain considers randomization in frequency domain in addition to time domain. The interleaving can be separate interleaving or integrated interleaving. For separate interleaving, the time domain randomization and frequency domain randomization are performed separately. For integrated interleaving, integrated randomization involving both time domain and frequency domain is performed. The integrated interleaving has benefit of in-band emission (to avoid two UEs always in the same subframe). FIG. 11 shows an example of the separate interleaving and the integrated interleaving. In the example of FIG. 11, 4 time resources and 2 frequency resources are provided, and corresponding resource IDs are given in a frequency first manner. In the separate interleaving, time domain randomization is performed first and then time resource dependent swapping for frequency resource is applied. In the integrated interleaving, rotation of the resources is performed in a cyclic manner. It is noted that the interleaving manners shown in FIG. 11 are only examples, and other interleaving manners are also possible.

Figure 12:
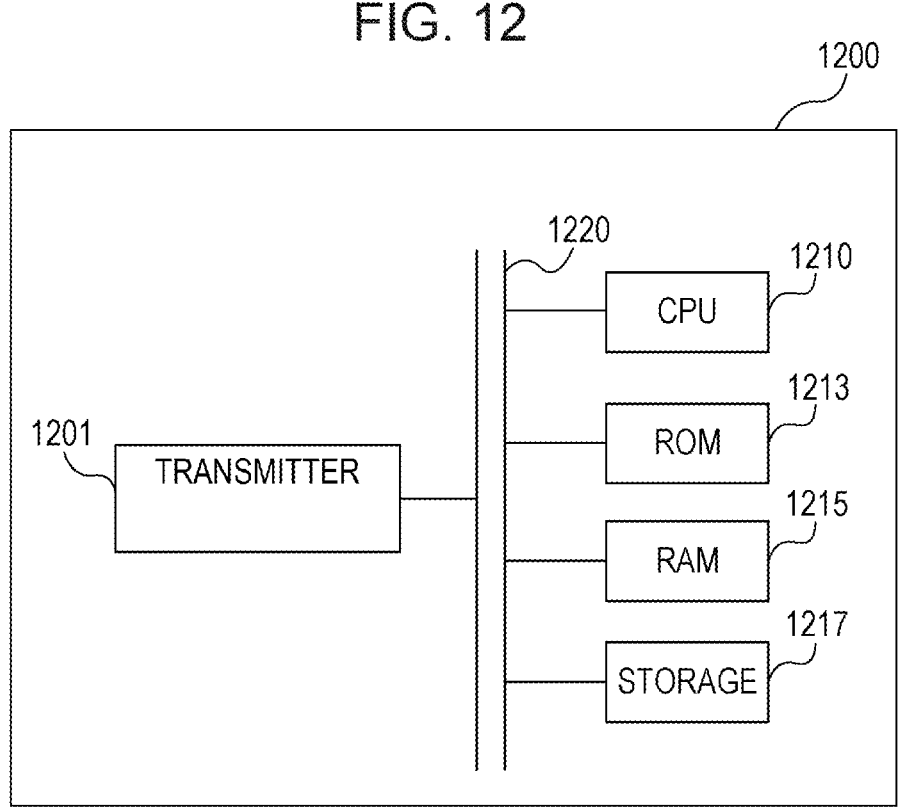
FIG. 12 is a block diagram illustrating a D2D-enabled wireless device according to an embodiment of the present disclosure.

According to the first embodiment of the present disclosure, a device-to-device (D2D)-enabled wireless device (e.g. a D2D-enabled UE) 1200 is also provided. FIG. 12 is a block diagram illustrating the D2D-enabled wireless device 1200 according to the first embodiment of the present disclosure. The D2D-enabled wireless device 1200 includes a transmitter 1201 configured to transmit signals in D2D subframes with a randomization pattern in time domain, wherein the randomization pattern is designed based on relative subframe positions in a virtual pure D2D subframe sequence composed of multiple D2D subframes in one or more radio frames.

The D2D-enabled wireless device 1200 according to the present disclosure may optionally include a CPU (Central Processing Unit) 1210 for executing related programs to process various data and control operations of respective units in the wireless device 1200, a ROM (Read Only Memory) 1213 for storing various programs required for performing various process and control by the CPU 1210, a RAM (Random Access Memory) 1215 for storing intermediate data temporarily produced in the procedure of process and control by the CPU 1210, and/or a storage unit 1217 for storing various programs, data and so on. The above transmitter 1201, CPU 1210, ROM 1213, RAM 1215 and/or storage unit 1217 etc. may be interconnected via data and/or command bus 1220 and transfer signals between one another.

Respective units as described above do not limit the scope of the present disclosure. According to one implementation of the disclosure, the functions of the above transmitter 1201 may be implemented by hardware, and the above CPU 1210, ROM 1213, RAM 1215 and/or storage unit 1217 may not be necessary. Alternatively, the functions of the above transmitter 1201 may also be implemented by functional software in combination with the above CPU 1210, ROM 1213, RAM 1215 and/or storage unit 1217 etc.

It is noted that the above descriptions for the methods also apply to the devices, and thus the details are omitted here.

Second Embodiment

As mentioned in the above, 3GPP RAN1#76 meeting has agreed eNB scheduling based resource allocation (Mode 1) as baseline method in network-coverage (INC) scenario and UE selection on its own based resource allocation (Mode 2) is baseline resource allocation method in out-of-coverage (OOC) scenario. In the second embodiment of the present disclosure, it is provided that the Mode 1 resource allocation and the Mode 2 resource allocation share a same randomization pattern design in order to avoid resource collision between different randomization patterns considering eNB may flexibly configure the randomization pattern boundary between Mode 1 and Mode 2. It is noted that the resource herein refers to not only data but also control and discovery resource. The Mode 1 resource allocation and the Mode 2 resource allocation are also referred to as the eNB scheduling based resource allocation and the D2D-enabled wireless device selection on its own based resource allocation respectively.

Figure 13:
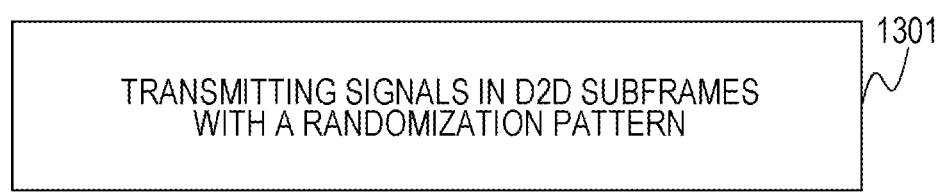
FIG. 13 illustrates a flowchart of a D2D communication method performed by a D2D-enabled wireless device according to another embodiment of the present disclosure.

FIG. 13 shows a flowchart of a D2D communication method 1300 performed by a D2D-enabled wireless device according to the second embodiment, including a step 1301 of transmitting signals in D2D subframes with a randomization pattern, wherein the eNB scheduling based resource allocation and the D2D-enabled wireless device selection on its own based resource allocation share a same randomization pattern design.

As described in the above, in the present disclosure, the term of "randomization pattern design" refers to a principle, an equation, a list or the like for determining the randomization pattern. For example, a pattern list consisting of multiple randomization patterns which are usually not collided with each other can be regarded as a randomization pattern design. Mode 1 and Mode 2 sharing a same randomization pattern design can mean that the resources for transmission in Mode 1 and Mode 2 can both be selected from the same randomization pattern list. In this case, eNB could flexibly configure which randomization patterns belong to Mode 1 and which patterns belong to Mode 2, and any two of the randomization patterns have no collision.

Figure 14:
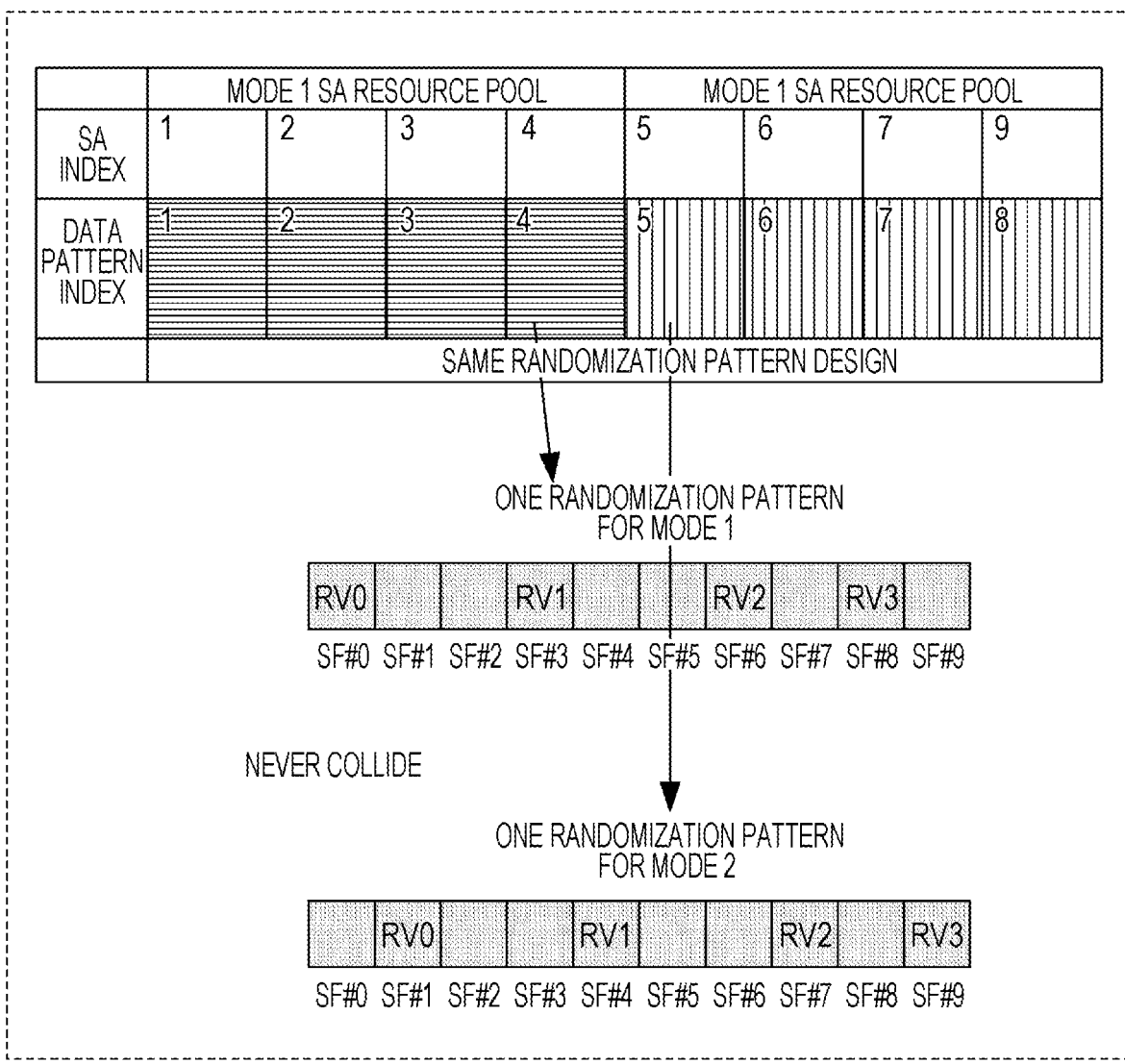
FIG. 14 illustrates an example of randomization pattern designing according to another embodiment of the present disclosure.

FIG. 14 shows an example of randomization pattern designing according to the second embodiment. FIG. 14 shows that data patterns (randomization pattern) 1-4 are used for Mode 1 resource allocation and patterns 5-8 are used for Mode 2 resource allocation. It is noted that the data or randomization pattern in the second embodiment can refer to a randomization pattern in time domain or a randomization pattern in both time domain and frequency domain as shown in FIG. 2. FIG. 14 shows an example in time domain. According to the second embodiment of the present disclosure, Mode 1 and Mode 2 share a same randomization pattern design, so these 8 patterns do not collide with each other. Suppose eNB reconfigures that data patterns 1-3 are used for Mode 1 resource allocation and data patterns 4-8 are used for Mode 2 resource allocation, since the same design is considered for all these patterns, no collision would exist. For example, four retransmissions in data pattern 4 can transmitted in SF #0, SF #3, SF #6 and SF #8 and another four retransmissions in data pattern 5 can be transmitted in SF #1, SF #4, SF #7 and SF #9. In contrast, if Mode 1 and Mode 2 do not share the same randomization design, data pattern 4 may collide with any of data patterns 5-8 when data pattern 4 is reconfigured for Mode 2 resource allocation since data pattern 4 is designed irrelevant to data patterns 5-8 in this case.

It is noted that the second embodiment can be combined with the first embodiment or with the solution of designing randomization patterns based on absolute D2D subframe and/or frame index.

Figure 15:
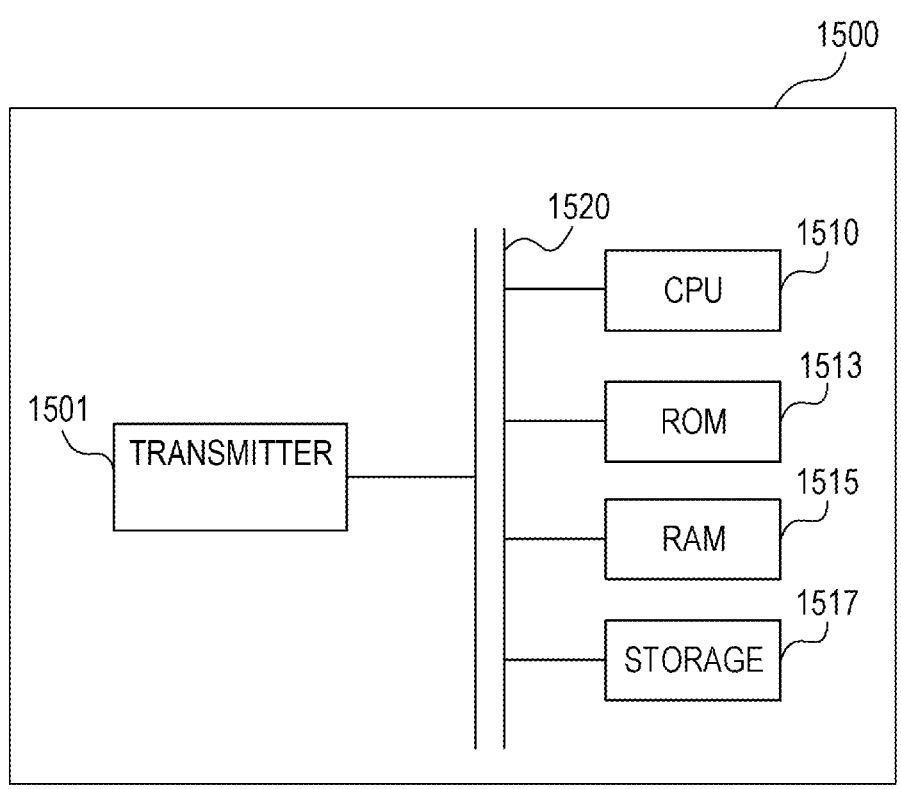
FIG. 15 is a block diagram illustrating a D2D-enabled wireless device according to another embodiment of the present disclosure.

According to the second embodiment of the present disclosure, a device-to-device (D2D)-enabled wireless device (e.g. a D2D-enabled UE) 1500 is also provided. FIG. 15 is a block diagram illustrating the D2D-enabled wireless device 1500 according to the second embodiment of the present disclosure. The D2D-enabled wireless device 1500 includes: a transmitter 1501 configured to transmit signals in D2D subframes with a randomization pattern, wherein the eNB scheduling based resource allocation and the D2D-enabled wireless device selection on its own based resource allocation share a same randomization pattern design.

The D2D-enabled wireless device 1500 according to the present disclosure may optionally include a CPU (Central Processing Unit) 1510 for executing related programs to process various data and control operations of respective units in the D2D-enabled wireless device 1500, a ROM (Read Only Memory) 1513 for storing various programs required for performing various process and control by the CPU 1510, a RAM (Random Access Memory) 1515 for storing intermediate data temporarily produced in the procedure of process and control by the CPU 1510, and/or a storage unit 1517 for storing various programs, data and so on. The above transmitter 1501, CPU 1510, ROM 1513, RAM 1515 and/or storage unit 1517 etc. may be interconnected via data and/or command bus 1520 and transfer signals between one another.

Respective units as described above do not limit the scope of the present disclosure. According to one implementation of the disclosure, the functions of the above transmitter 1501 may be implemented by hardware, and the above CPU 1510, ROM 1513, RAM 1515 and/or storage unit 1517 may not be necessary. Alternatively, the functions of the above transmitter 1501 may also be implemented by functional software in combination with the above CPU 1510, ROM 1513, RAM 1515 and/or storage unit 1517 etc.

It is noted that the above descriptions for the methods also apply to the devices, and thus the details are omitted here.

The present disclosure can be realized by software, hardware, or software in cooperation with hardware. Each functional block used in the description of each embodiment described above can be realized by an LSI as an integrated circuit. They may be individually formed as chips, or one chip may be formed so as to include a part or all of the functional blocks. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, an FPGA (Field Programmable Gate Array) that can be programmed after the manufacture of the LSI or a reconfigurable processor in which the connections and the settings of circuit cells disposed inside the LSI can be reconfigured may be used. Further, the calculation of each functional block can be performed by using a calculating device, for example, including a DSP or a CPU, and the processing step of each function may be recorded on a recording medium as a program for execution. Furthermore, when a technology for implementing an integrated circuit that substitutes the LSI appears in accordance with the advancement of the semiconductor technology or other derivative technologies, it is apparent that the functional block may be integrated by using such technologies.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

What is claimed is:
1. A communication apparatus comprising:
control circuitry which, in operation, configures a plurality of subframe sequences each including a plurality of device-to-device (D2D) subframes for D2D communication, and determines a first set of transmission subframe(s) from each of the subframe sequences according to a resource randomization pattern in a time domain,
wherein the resource randomization pattern is repeated for each of the subframe sequences and identifies at least one of the D2D subframes in each of the subframe sequences as the transmission subframe used for D2D data transmission, and lengths of the subframe sequences are determined arbitrarily depending on different applications; and
a transmitter which, in operation, maps a first signal to the first set of transmission subframes(s) and transmits the mapped first signal.

2. The communication apparatus according to claim 1, wherein the plurality of D2D subframes in each of the subframe sequences are arranged in increasing order of subframe indices.

3. The communication apparatus according to claim 2, wherein the plurality of D2D subframes in each of the subframe sequences are grouped in one or more frames.

4. The communication apparatus according to claim 1, wherein the resource randomization pattern is a time resource randomization pattern that defines subframe indices of transmission subframes in each of the subframe sequences.

5. The communication apparatus according to claim 1, wherein
the control circuitry, in operation, determines a second set of transmission subframe(s) from each of the subframe sequences according to the resource randomization pattern, wherein the second set of transmission subframe(s) is different from the first set of transmission subframe(s); and
the transmitter, in operation, maps a second signal to the second set of transmission subframe(s) and transmits the mapped second signal.

6. The communication apparatus according to claim 5, wherein the first set of transmission subframe(s) is for D2D transmission mode 1 and the second set of transmission subframe(s) is for D2D transmission mode 2.

7. The communication apparatus according to claim 6, wherein the D2D transmission mode 1 is a transmission mode in which the D2D communication is performed within network coverage based on network scheduling, and the D2D transmission mode 2 is another transmission mode in which the D2D communication is performed within or out of network coverage based on the communication apparatus's autonomous scheduling.

8. The communication apparatus according to claim 1, wherein some of the plurality of D2D subframes in each of the subframe sequences are not consecutive.

9. A communication method comprising:
configuring a plurality of subframe sequences each including a plurality of device-to-device (D2D) subframes for D2D communication;
determining a first set of transmission subframe(s) from each of the subframe sequences according to a resource randomization pattern in a time domain, wherein the resource randomization pattern is repeated for each of the subframe sequences and identifies at least one of the D2D subframes in each of the subframe sequences as the transmission subframe used for D2D data transmission, and lengths of the subframe sequences are determined arbitrarily depending on different applications;
mapping a first signal to the first set of transmission subframe(s); and
transmitting the mapped first signal.

10. The communication method according to claim 9, wherein the plurality of D2D subframes in each of the subframe sequences are arranged in increasing order of subframe indices.

11. The communication method according to claim 10, wherein the plurality of D2D subframes in each of the subframe sequences are grouped in one or more frames.

12. The communication method according to claim 9, wherein the resource randomization pattern is a time resource randomization pattern that defines subframe indices of transmission subframes in each of the subframe sequences.

13. The communication method according to claim 9, comprising:
determining a second set of transmission subframe(s) from each of the subframe sequences according to the resource randomization pattern, wherein the second set of transmission subframe(s) is different from the first set of transmission subframe(s);
mapping a second signal to the second set of transmission subframe(s); and
transmitting the mapped second signal.

14. The communication method according to claim 13, wherein the first set of transmission subframe(s) is for D2D transmission mode 1 and the second set of transmission subframe(s) is for D2D transmission mode 2.

15. The communication method according to claim 14, wherein the D2D transmission mode 1 is a transmission mode in which the D2D communication is performed within network coverage based on network scheduling, and the D2D transmission mode 2 is another transmission mode in which the D2D communication is performed within or out of network coverage based on a communication apparatus's autonomous scheduling.

16. The communication method according to claim 9, wherein some of the plurality of D2D subframes in each of the subframe sequences are not consecutive.

* * * * *